(12) United States Patent
Heim et al.

(10) Patent No.: US 8,738,781 B2
(45) Date of Patent: May 27, 2014

(54) LAUNCHING A VIRTUAL MACHINE ASSOCIATED WITH A CLIENT DURING STARTUP

(75) Inventors: Itamar Heim, Tel Aviv (IL); Miki Kenneth, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 913 days.

(21) Appl. No.: 12/489,266

(22) Filed: Jun. 22, 2009

(65) Prior Publication Data

US 2010/0325278 A1 Dec. 23, 2010

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| | | |
|---|---|---|
| 7,865,893 B1 | 1/2011 | Omelyanchuk et al. |
| 2004/0145605 A1 | 7/2004 | Basu et al. |
| 2006/0090157 A1* | 4/2006 | Park et al. ............ 717/140 |
| 2006/0155735 A1* | 7/2006 | Traut et al. ............ 707/101 |
| 2006/0230438 A1 | 10/2006 | Shappir et al. |
| 2007/0094348 A1 | 4/2007 | Scheidel et al. |
| 2007/0130305 A1 | 6/2007 | Piper et al. |
| 2007/0180436 A1 | 8/2007 | Travostino et al. |
| 2007/0253436 A1 | 11/2007 | Henry et al. |
| 2007/0266389 A1 | 11/2007 | Ganguly et al. |
| 2007/0283348 A1 | 12/2007 | White |
| 2008/0046581 A1 | 2/2008 | Molina et al. |
| 2008/0195760 A1 | 8/2008 | Nudler |
| 2008/0201414 A1 | 8/2008 | Husain et al. |
| 2008/0235361 A1 | 9/2008 | Crosbie et al. |
| 2009/0172136 A1* | 7/2009 | Schulz et al. .................. 709/222 |
| 2009/0216975 A1 | 8/2009 | Halperin et al. |
| 2009/0282234 A1* | 11/2009 | Faraboschi et al. ............... 713/2 |
| 2009/0288167 A1 | 11/2009 | Freericks et al. |
| 2010/0058342 A1 | 3/2010 | Machida |
| 2010/0131654 A1 | 5/2010 | Malakapalli et al. |
| 2010/0138475 A1 | 6/2010 | Frank et al. |
| 2010/0235831 A1 | 9/2010 | Dittmer |
| 2010/0293146 A1 | 11/2010 | Bonnet et al. |
| 2010/0306771 A1 | 12/2010 | Kamay et al. |

OTHER PUBLICATIONS

Clark, Christopher, et al., "Live Migration of Virtual Machines," Proceedings of the 2nd USENIX Symposium on Networked Systems Design and Implementation, 2005, 14 pages.

"KVM: Migrating a VM," Qumranet, Migration—Kernel based Virtual Machine, http://kvm.qumranet.com/kvmwiki/Migration, 5 pages.

(Continued)

*Primary Examiner* — Thomas Dailey
(74) *Attorney, Agent, or Firm* — Lowenstein Sandler LLP (57) ABSTRACT

Techniques for automatically launching a virtual machine associated with a client during startup are described herein. According to one embodiment, a virtual machine (VM) associated with a client is identified by a controller, in response to a message received by the controller from a client over a network indicating that the client is starting up. The VM may be one of a predetermined VM, a member of a group of VMs that are associated with the client, and a VM selected from a pool of VMs. The controller causes the associated VM to be launched automatically over the network as a part of a startup process of the client without user intervention. Other methods and apparatuses are also described.

21 Claims, 9 Drawing Sheets

(56) References Cited

OTHER PUBLICATIONS

Lublin, Uri, et al., "Qumranet, KVM: Live Migration," KVM Forum, 2007, 28 pages.
Office Action mailed Nov. 23, 2010, for U.S. Appl. No. 12/489,276.
"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.
Office Action for U.S. Appl. No. 12/489,273, mailed Jan. 21, 2011.
Office Action for U.S. Appl. No. 12/489,276, mailed Apr. 27, 2011.
Office Action for U.S. Appl. No. 12/489,273, mailed Jun. 27, 2011.
Office Action for U.S. Appl. No. 12/489,273, mailed Oct. 5, 2011.
Office Action for U.S. Appl. No. 12/489,273, mailed Feb. 14, 2012.
USPTO, Office Action for U.S. Appl. No. 12/489,259 mailed Apr. 9, 2012.
USPTO, Notice of Allowance for U.S. Appl. No. 12/489,259 mailed Aug. 16, 2012.
USPTO, Notice of Allowance for U.S. Appl. No. 12/489,276 mailed Nov. 4, 2011.
USPTO, Notice of Allowance for U.S. Appl. No. 12/489,276 mailed Dec. 15, 2011.
USPTO, Advisory Action for U.S. Appl. No. 12/489,273 mailed Sep. 26, 2011.
USPTO, Notice of Allowance for U.S. Appl. No. 12/489,273 mailed Jun. 1, 2012.

\* cited by examiner

```
┌─────────────────────┐     ┌─────────────────────┐     ┌─────────────────────┐
│ In response to a    │     │ The controller      │     │ Automatically       │
│ client/user starting│     │ automatically       │     │ establishes a       │
│ up, a controller    │ ──▶ │ launches the VM     │ ──▶ │ connection (e.g.,   │
│ identifies a VM     │     │ associated with the │     │ SPICE) between the  │
│ that is associated  │     │ client/user.        │     │ client and the      │
│ with the client/    │     │ 502                 │     │ associated VM       │
│ user.               │     │                     │     │ without requiring a │
│ 501                 │     │                     │     │ user of the client  │
│                     │     │                     │     │ to login and to     │
│                     │     │                     │     │ select the VM.      │
│                     │     │                     │     │ 503                 │
└─────────────────────┘     └─────────────────────┘     └─────────────────────┘
```

LAUNCHING A VIRTUAL MACHINE ASSOCIATED WITH A CLIENT DURING STARTUP

RELATED APPLICATIONS

This application is related to co-pending U.S. patent application Ser. No. 12/489,259, entitled "Method for Improving Boot Time of a Client Having a Virtualized Operating Environment"; co-pending U.S. patent application Ser. No. 12/489,273, entitled "Method for Automatically Providing a Client with Access to an Associated Virtual Machine"; and co-pending U.S. patent application Ser. No. 12/489,276, entitled "Automatic Virtual Machine Migration in Mixed SBC/CBC Environment".

TECHNICAL FIELD

Embodiments of the present invention relates generally to virtual machines. More particularly, embodiments relate to techniques for efficiently launching a virtual machine.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization machines.

The virtualization technologies have wide applications in the computer field with the development of computer systems. For example, such virtualization technologies can be used to implement a virtual desktop application which runs within a virtual machine of a host and accessed from a client over a network, such as, for example, SolidICE™ available from Qumranet®, Inc. of Israel, a subsidiary of Red Hat, Inc. of Raleigh, N.C.

Typically, in such a configuration, after a client machine starts up, a user has to log onto a Web portal via a Web browser to select a VM (e.g., a virtual desktop) to be launched and accessed by the client. That is, a VM is launched after the client starts up and the VM launching may take a relatively long period of time. In addition, it requires a user of the client to actively and manually select a VM to be launched, making it inconvenient and cumbersome to certain users.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for automatically launching a virtual machine associated with a client during startup are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one aspect of the invention, a virtual machine is configured to be associated with a client machine. Such a configuration may be performed by an administrator of the client machine and the configuration information of the client machine may be stored in a database of a control or administration server. When the client machine starts up, the associated virtual machine is automatically launched without user intervention. Note that the term of "client" is utilized in view of a management or control server in a relative sense. A client can host a VM locally (e.g., as a power client or a server node) and be coupled to a VM hosted in a remote node (e.g., as a client node). Thus, a client could be both a server node and a client node dependent upon a specific configuration.

According to one embodiment, a VM may be configured to be associated with a client (e.g., a client machine) or it can be associated with a user. When a VM is associated with a client, all users of the same client may be associated with the same VM. Alternatively, when a VM is associated with the user, some users of the same client may be associated with the same or different VMs dependent upon a specific configuration of the client and/or users. Also note that a client and/or a user may be associated with multiple or a pool of VMs. When a client starts up and/or user logs in, one or more associated VMs may be automatically launched. Further, according to one embodiment, one or more applications may also be associated with a client. Thus, once a client has started up; an associated VM has been launched; and a connection has been established between the client and the associated VM, one or more applications associated with the client may also be automatically launched, for example, within the associated VM.

According to another aspect of the invention, a virtual machine associated with a client may be automatically launched in parallel with a startup process of the client machine. The virtual machine may be launched at a host or another node different than the client machine.

According to another aspect of the invention, if a client machine is a power client (that is, the client that has sufficient processing resources to host a virtual machine), a virtual machine launched at another node may be migrated to the client subsequently. As a result, the speed for starting up a virtual operating environment for the client machine is greatly improved.

According to another aspect of the invention, after the client machine starts up, a connection is automatically established for the client to access the associated virtual machine that has been launched in parallel with the client's startup process. As a result, a user of the client is not required to log onto a Web portal and to manually select a virtual machine to be launched. Furthermore, since most the above operations are performed automatically and transparently to a user, once the client machine finishes the startup process, an application that is running within the virtual machine (e.g., virtual desktop application) is immediately available for the user as if the user were accessing an application locally. The application may also be launched automatically once the connection has been established.

Note that a communications session may be associated with a specific VM (e.g., per VM basis) in which substantially all applications running within the VM share the same communications session, for example, via different communications channels. The communications session may be compatible with a simple protocol for independent computing environment (SPICE) available from Red Hat, Inc. of Raleigh, N.C. and/or a remote desktop protocol (RDP) available from Microsoft corporation of Redmond, Wash.

Figure 1:
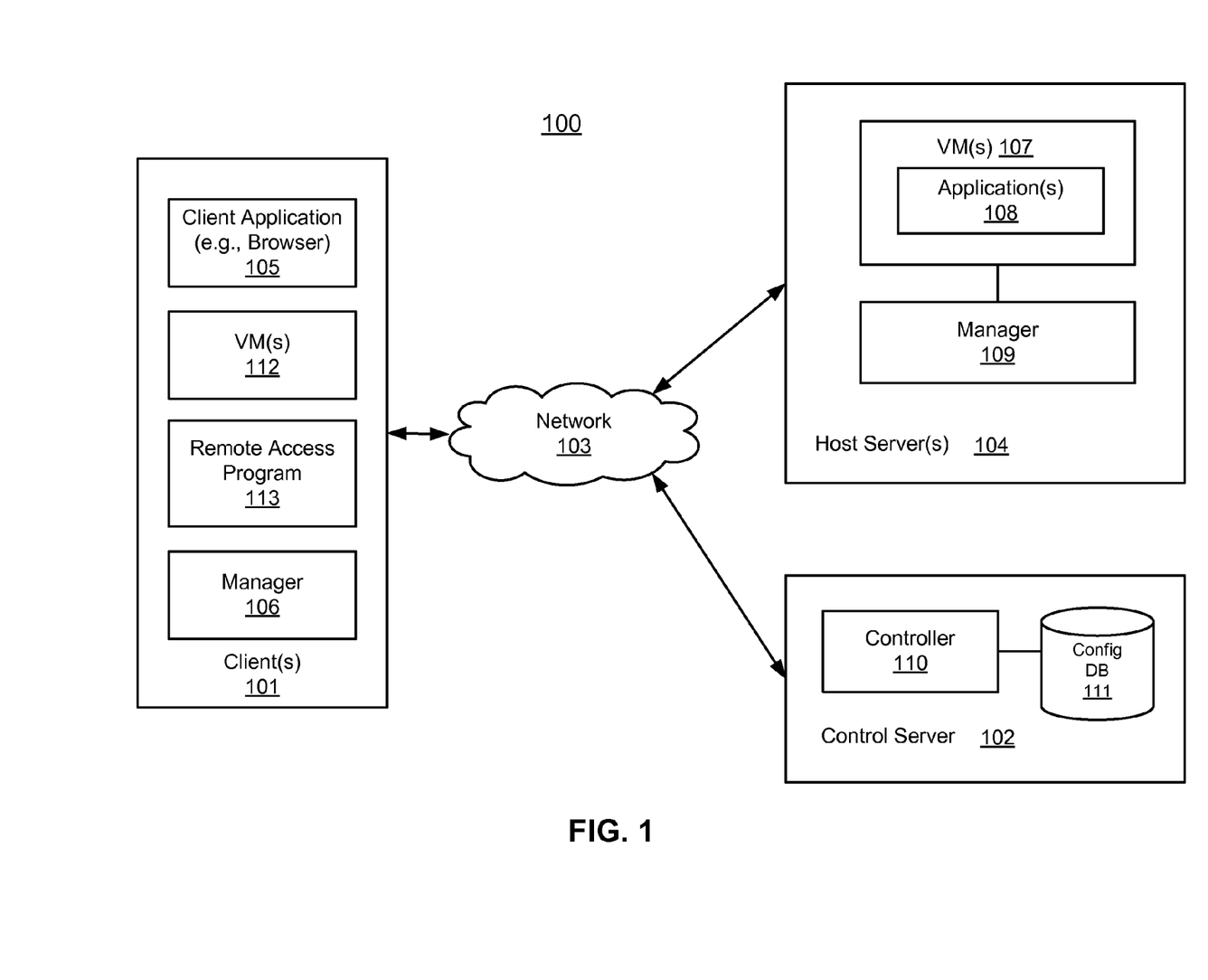
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications hosted by server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent, not shown) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be managed by a control server 102 (also referred to as a management server or system). For example, in a graphics remoting application, host server 104 may be implemented as a VDS (virtual desktop server) while control server 102 may be implemented as a VDC (virtual desktop controller) server.

Figure 2:
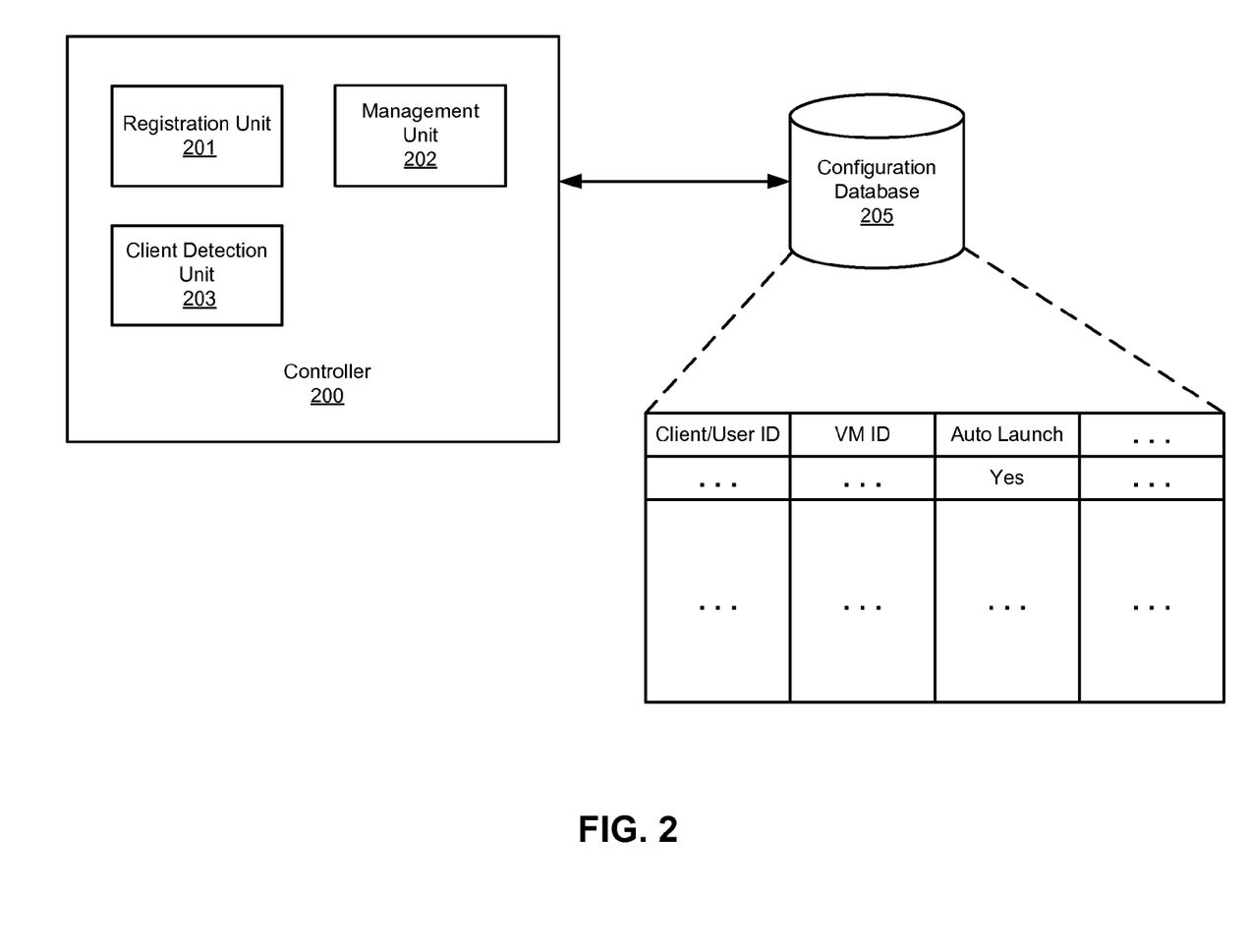
FIG. 2 is a block diagram illustrating an example of a control server according to one embodiment.

Referring back to FIG. 1 according to one embodiment, prior to launching a VM, the VM is defined and configured within control server 102, for example, by an administrator. For example, a VM may be defined and configured to be associated with client 101 and/or a user of client 101. Such configuration information may be stored in a configuration database 111 of control server 102. An example of the configuration database is shown in FIG. 2.

When client 101 is registered with control server 102, client 101 may be identified via its IP address, name, UUID (universally unique identifier), or other stronger mechanisms (e.g., a locally installed agent with a certificate). Note that a client does not have to be specifically registered with the system. Rather, a client can be identified by a range definition or a wildcard, etc. that represents one or more groups of clients. That is, a client may register as a member of one or more groups of clients (e.g., a member of a particular domain). Each group of clients may be associated with one or more VMs or a pool of VMs.

During registration with the system, a client (or a range of clients) can be associated with a single VM, a group of VMs, or a pool of VMs. Alternatively, one or more applications may also be associated with a particular VM or the client. When a client is registered with a single VM, the VM may be automatically started when the client is detected starting up and the associated VM is configured to be automatically started (e.g., having an "auto launch" flag or option enabled as shown in FIG. 2). Alternatively, during operations, if it is detected that a VM is down or suspended, the VM may be automatically resumed. When a client is associated with a group of VMs, all associated VMs that have been configured to be automatically started (e.g., having an "auto launch" option enabled) will be automatically started or resumed. When a client is associated with a pool of VMs and the pool has one or more VMs available for automatic launch, one or more VMs may be allocated from the pool to the client and the allocated VMs may be automatically started up or resumed.

Similarly, there may be a corresponding "auto launch" option for an application that is associated with a particular VM or client. The automatically launching an application can be implemented in a variety of manners. According to one embodiment, a guest can be preconfigured to automatically launch a set of one or more applications. In addition, a guest may include an agent (e.g., a SolidICE agent) that is provided a list of one or more applications to be launched after booting of the corresponding client. Further, a guest may have a built-in support for accepting a request from a remote node for launching an application. For example, a remote access application such as RDP or SPICE) supports launching of a specific application at the connection time. Such a program may have a capability of accepting the name of an application to be automatically launched as a parameter.

In an environment where multiple clients may access multiple VMs, there are benefits to associating a VM, a group of VMs, or a pool of VMs to a client. By associating a VM (a group of VMs or a pool of VMs) to a client, a VM can be automatically started if the VM is down or when a client is detected starting up. The automatic launch of a VM can improve performance for an end user, as the VM boot/resume process can be performed in parallel to the client boot process.

Referring back to FIG. 1, subsequently, when client 101 starts up, a management module 106 running within client 101 may communicate with control server 102, indicating that the client 101 is starting up. For example, management module 106 may be implemented as a part of communication stack, such as a SPICE™ agent, Management module 106 may be implemented as part of a VDSM (virtual desktop server manager), which may be configured to subsequently launch a remote access program such as a SPICE session to access a VM. Alternatively, controller 110 may periodically poll (e.g., ping) client 101 in order to determine whether client 101 is starting up.

For example, a management system such as control server 102 can periodically ping a client to detect whether the client is starting up. Typically, a communication stack of a client such as a TCP/IP stack usually can start responding to the ping before the client finishes the entire startup process and is available for a user to start working at the client. Alternatively, the management system may be notified by a local agent (e.g., manager 106 of client 101) installed on the client (and configured to start as early as possible) that the client is going up (or the management system periodically polls the agent for such an indication).

In addition, if a client performs a PXE (preboot execution environment) boot process, a PXE server notifies the management system that the client is about to start up. Typically, the PXE boot process takes place prior to the client actually starting to boot, which is earlier than the two methods described above. Furthermore, the management system may monitor DHCP (dynamic host configuration protocol) requests initiated from the client or alternatively, the management system may be notified from the DHCP server for such an indication.

Referring back to FIG. 1, in response to the client starting up, controller 110 of control server 102 causes a VM and/or an application to be hosted by a particular VM that has been configured and associated with client 101 to be launched automatically. That is, the associated VM and/or application can be automatically launched without user intervention, based on the configuration information associated with the client. The associated VM and/or application may be automatically launched within the client after the client has started up. Alternatively, the associated VM and/or application may be automatically launched at another node (e.g., CBC or SBC node) concurrently while the client is starting up.

For example, if client 101 is a thin client, the associated VM may be launched as VM 107 of host 104. In one embodiment, the associated VM may be launched as VM 107 at server 104 substantially concurrently while client 101 is starting up. Thus, when client 101 has started, the associated VM is up and ready to be utilized.

Note that as described above, the association of a VM may be configured per client basis, per user basis, and/or per organization/enterprise basis. When a VM is associated with a client, all users using the same client will use the same VM. Similarly, when a VM is associated with an organization entity, all users associated with the organization entity are using the same type of VMs or same pool of VMs. Instead of waiting for a user to request a VM to be started up, a VM may be pre-launched once a user of a client is detected accessing the client (e.g., existence of the user). For example, a VM may be automatically launched as a part of the authentication service of a user without waiting for the user to actually log in and specifically request to launch the VM.

According to one embodiment, a VM may be configured to be automatically launched or to be manually launched. According to a particular embodiment, an "auto launch" flag or option may be associated with each VM (as shown in FIG. 2) such that an administrator or user can specifically configure which VM is to be automatically launched. Similarly, a VM may be associated with an "auto suspend" option or flag such that the VM can be automatically suspended if the VM is detected idle. Other configurations may exist.

Referring back to FIG. 1, according to one embodiment, once the client and the associated VM are up and running, a connection (e.g., SPICE or RDP session) between client 101 and host 104 is automatically established for client application 105 to access VM 107. Similarly, if the VM is automatically launched locally as VM 112 within client 101, a local connection is automatically established between client application 105 and VM 112. Once the connection has been established, one or more associated applications may also be automatically launched. In this way, a user of client 101 does not have to log onto a Web portal to select a VM (e.g., a virtual desktop application) to be launched. The access to the associated VM can be automatically provided to the user of client 101 once client 101 finishes the startup process.

As a result, a user can "see" the remote VM as part of the client boot process. The user may not need to log in to the management system, to select a VM to be launched, and to connect with the launched VM. This improves the boot process from a user perspective, since the user does not need to take any action related to the VM or to the management system (e.g., login). The boot process is performed just as a normal boot process regularly performed at the client. A user may simply "see" one or more VMs associated with the client.

According to one embodiment, when a client starts up and is detected by the management system, if a VM associated with a client has an "auto launch" option enabled, the management system causes the associated VM to be launched automatically. Once the client and the VM are up and running (based on communications between controller 110 and managers 106 and 109), the management system causes a remote access program (e.g., remote access program 113 such as an RDP or SPICE agent) to be launched at the client.

In one embodiment, the management system may send a command to an agent installed at the client to start the remote access program. Alternatively, the management system can utilize other remote access invocation methods (e.g., shell, WMI, remote service launch, etc.) on the client (including deploying the remote access program on the first use and/or validating that such a program is up to date prior to launching, etc.) Further, a client can launch the remote access program by itself based on the operating status of the VM (e.g., polling). Other methods may exist.

Referring back to FIG. 1, if client 101 is a power client who has sufficient resources to host the associated VM (e.g., based on the associated configuration information stored in database 111), the associated VM may be launched as VM 112 within client 101. Alternatively, according to one embodiment, the associated VM can be launched at host 104 (e.g., as part of VM 107) substantially concurrently while client 101 is starting up. After client 101 has started up, a connection (e.g., RDP or SPICE session) to the launched VM is established for accessing the VM. Subsequently, the associated VM 107 is migrated back to client 101 (e.g., as part of VM 112).

For example, when a client starts up, instead of waiting for the client to finish the startup process before launching a VM associated with the client, the associated VM is launched at a remote node (e.g., either to be a power client or a server host) concurrently. Once the client has started up and the VM has been launched, a connection (e.g., RDP or SPICE session) is established automatically between the client and the VM running at the remote node to allow the client to access contents provided by the VM (e.g., virtual desktop application). Subsequently, if the client is capable of hosting the associated VM (e.g., has enough processing resources to host the associated VM), a new VM is launched within the client and the VM running at the remote node is migrated from the remote node to the new VM running within the client. Such a migration may be a live migration with minimum user distraction.

According to another embodiment, referring back to FIG. 1, if client 101 is a thin client, the associated VM can be launched at another power client (e.g., CBC or client-based computing node) and subsequently, the VM is migrated from the power client to another host server (e.g., SBC or server-based computing node).

When working in an environment involving client-based computing (CBC), there is a benefit to run a VM on a client machine. One of the benefits is to offload processing resources such as the CPU and/or memory resources of a server (e.g., the data center) by using the client resources to run the VM, while still maintaining other server-based computing (SBC) benefits such as the central image management, single image for all clients, etc. Another benefit is to provide a better end user performance, since there is no need to perform a remote access of the VM over a network. Instead, local resources of the client can be utilized.

In order to provide a seamless environment for the user, a user or the system is allowed to launch a VM at another node (e.g., another CBC host or SBC host) and to migrate the VM back to the client. If a user is accessing a VM from a CBC enabled client, the VM is migrated to the CBC client if a scheduling policy allows (e.g., if VM is allowed to run from a CBC client or the CBC client has enough resources to run the VM, etc.) The migration may be performed regardless whether the VM is currently running on an SBC host or a CBC host. If the user is accessing a VM from a non-CBC client and the VM is currently running within a CBC host, the VM may be migrated to an SBC host, vacating the current CBC host for another user. If a user is accessing a remote VM and the CBC client is currently hosting another VM locally that is not associated with the current user, the local VM may be migrated to an SBC host first, in order to allow the remote VM to be migrated to the CBC client subsequently. Optionally in either case, a user is allowed to have an option deciding whether to migrate a VM from its current location (e.g., the user may want to access the VM remotely).

Further, when accessing a VM via a communication session (e.g., SPICE or RDP session) over a network, the protocol compression may be enabled which consumes more CPU resources in order to reduce the bandwidth required. The migration logic also disables the compression when the communication session and the VM are running on the same client, and enables the compression when they are not running on the same client. The determination of enabling or disabling data compression may be performed whenever a client finishes migration and/or whenever a connection is coupled to the VM.

System migrations of virtual machines are performed for a variety of reasons, including the ability to provide a back-up system while hardware and/or software upgrades are being installed. The virtual machine (including memory, system, applications, etc.) that is being copied is typically referred to as the source virtual machine and the virtual machine that is built as a result of the migration is referred to as the target virtual machine. One method of ensuring that the target virtual machine correctly reflects the contents of the source virtual machine is to halt execution of the source virtual machine to perform the migration. A snapshot is taken of the source virtual machine. The snapshot is utilized to create the target virtual machine and the target virtual machine is started. Another approach to performing system migrations of virtual machines is to perform the migration while the source virtual machine is executing (also referred to as "live migration"). This avoids the lengthy outage time to transfer the memory contents from the source memory to the target machine.

Usually, a migration occurs only between SBC hosts sharing the same network. In a CBC situation, the clients are usually located on various networks. During a live migration, a guest VM does not expect the network to be changed since the network is transparent to the guest. During a CBC live migration, an additional process is performed to notify the guest of changing networks. In one embodiment, migration logic compares a network provided by a new host with a network provided by the previous host (e.g., comparing the IP address and subnets). If these networks do not match, the controller server (e.g., VDC) sends a notification of a network change. The network change can be implemented by a guest agent resetting the network configuration/service (e.g., using ipconfig, release, and/or renew commands), or by emulating an external network disconnect/connect with a long enough timeout for the guest to notice disconnect of the network. The latter has the benefits of being a more efficient approach since it does not require a guest agent and is more akin to a desktop being disconnected from one network and reconnected to another network.

FIG. 2 is a block diagram illustrating an example of a control server according to one embodiment. For example, controller 200 may be implemented as part of controller 110 of FIG. 1 and configuration database 205 may be implemented as part of database 111 of FIG. 1. In one embodiment, controller 200 includes, but is not limited to, a registration unit 201, a management unit 202, and a client detection unit 203.

When a client registers with a control server such as a VDC server, registration unit 201 is configured to associate a VM and/or an application with the client and store such information in configuration database 205. A VM may be a particular VM, a member of a group or pool of VMs. An application may be associated with a particular VM (a member of a group or pool of VMs) or a client. Subsequently, when a registered client starts up, client detection unit 203 is configured to detect such a startup process of the client using certain techniques described above. In one embodiment, a management or communications unit of the client may sends a message to client detection unit 203 indicating that the client is in a process of starting up. Alternatively, client detection unit 203 may periodically or constantly poll (e.g., ping) the client regarding the operating status of the client. In response, management unit 202 is configured to automatically launch a VM that is associated with the client if the associated VM has an "auto launch" option enabled. Note that some or all of the components as shown in FIG. 2 may be implemented in software, hardware, or a combination of both.

Figure 3A:
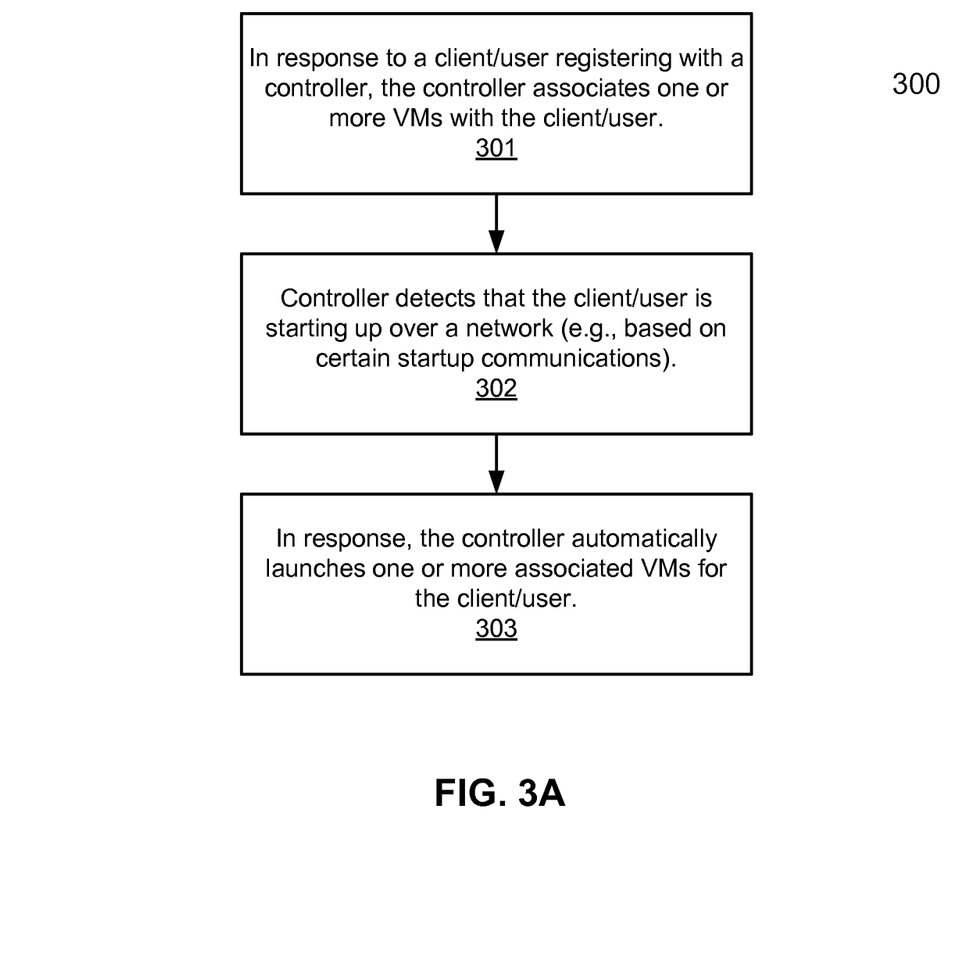
FIGS. 3A and 3B are flow diagrams illustrating a method for launching a virtual machine for a client according to certain embodiments.

FIG. 3A is a flow diagram illustrating a method for launching a virtual machine for a client according to one embodiment. Note that method 300 may be performed by processing logic which may include software, hardware, or a combination thereof. For example, method 300 may be performed by system 100 of FIG. 1. Referring to FIG. 3A, at block 301, when a client registers with a control server, the control server configures and associates a VM and/or an application with the client, where the configuration information is stored in a database storage associated with the control server. In one embodiment, one or more attributes associated with the VM (e.g., "auto launch" option) may also be specified and stored in the database. One or more VMs (e.g., individual VMs, a group of VMs, and/or a pool of VMs) may be configured and associated on a per client basis, per user basis, and/or per Enterprise entity basis.

At block 302, the control server detects that the client is starting up, for example, via certain communications between the client and the control server (e.g., a ping command). In response, the control server may examine the "auto launch" option of the associated VM to determine whether the associated VM should be automatically launched. If so, at block 303, the control server automatically launches the associated VM for the client. Other operations may also be performed.

Referring back to FIG. 2, according to one embodiment, a VM associated with a client may be automatically launched at another node (e.g., a CBC or SBC node) substantially concurrently, while the client is starting up. Thus, when the client is up and ready, so does the associated VM.

Figure 3B:
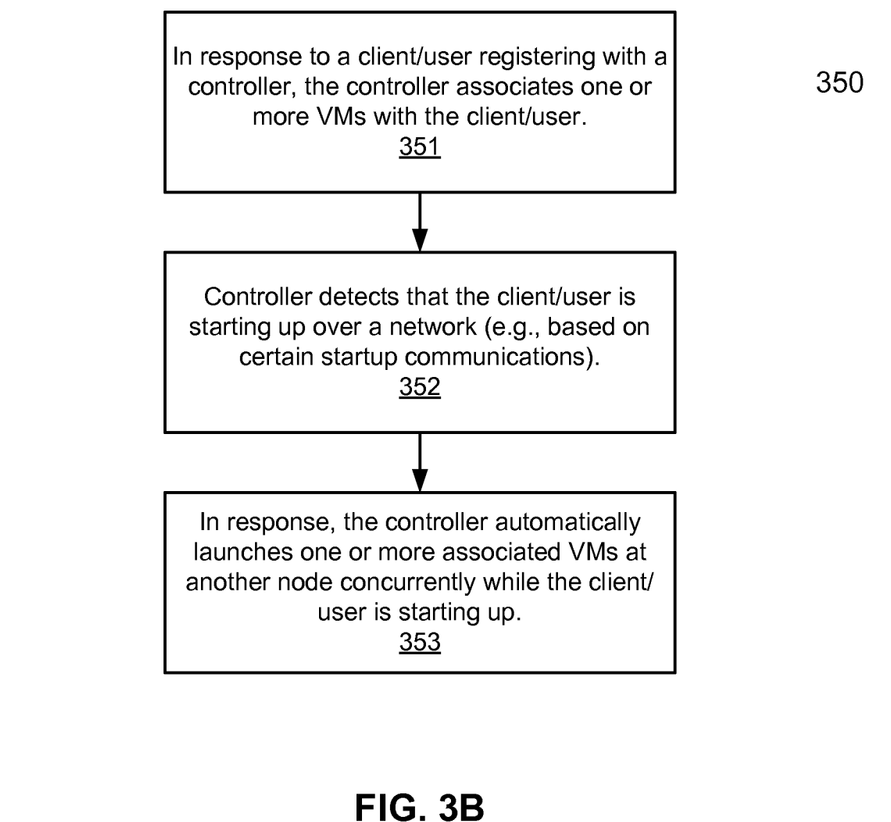

FIG. 3B is a flow diagram illustrating a method for launching a virtual machine for a client according to one embodiment. Note that method 350 may be performed by processing logic which may include software, hardware, or a combination thereof. For example, method 350 may be performed by the system 100 of FIG. 1. Referring to FIG. 3B, at block 351, when a client registers with a control server, the control server configures and associates a VM with the client, where the configuration information is stored in a database storage associated with the control server. In one embodiment, one or more attributes associated with the VM (e.g., "auto launch" option) may also be specified and stored in the database. One or more VMs (e.g., individual VMs, a group of VMs, and/or a pool of VMs) may be configured and associated on a per client basis, per user basis, and/or per Enterprise entity basis.

At block 352, the control server detects that the client is starting up, for example, via certain communications between the client and the control server (e.g., a ping command). In response, the control server may examine the "auto launch" option of the associated VM to determine whether the associated VM should be automatically launched. If so, at block 353, the control server automatically launches the associated VM at another node (e.g., another CBC node or SBC node) in parallel in order to speed up the booting process of both the client and the VM. Other operations may also be performed.

Figure 4:
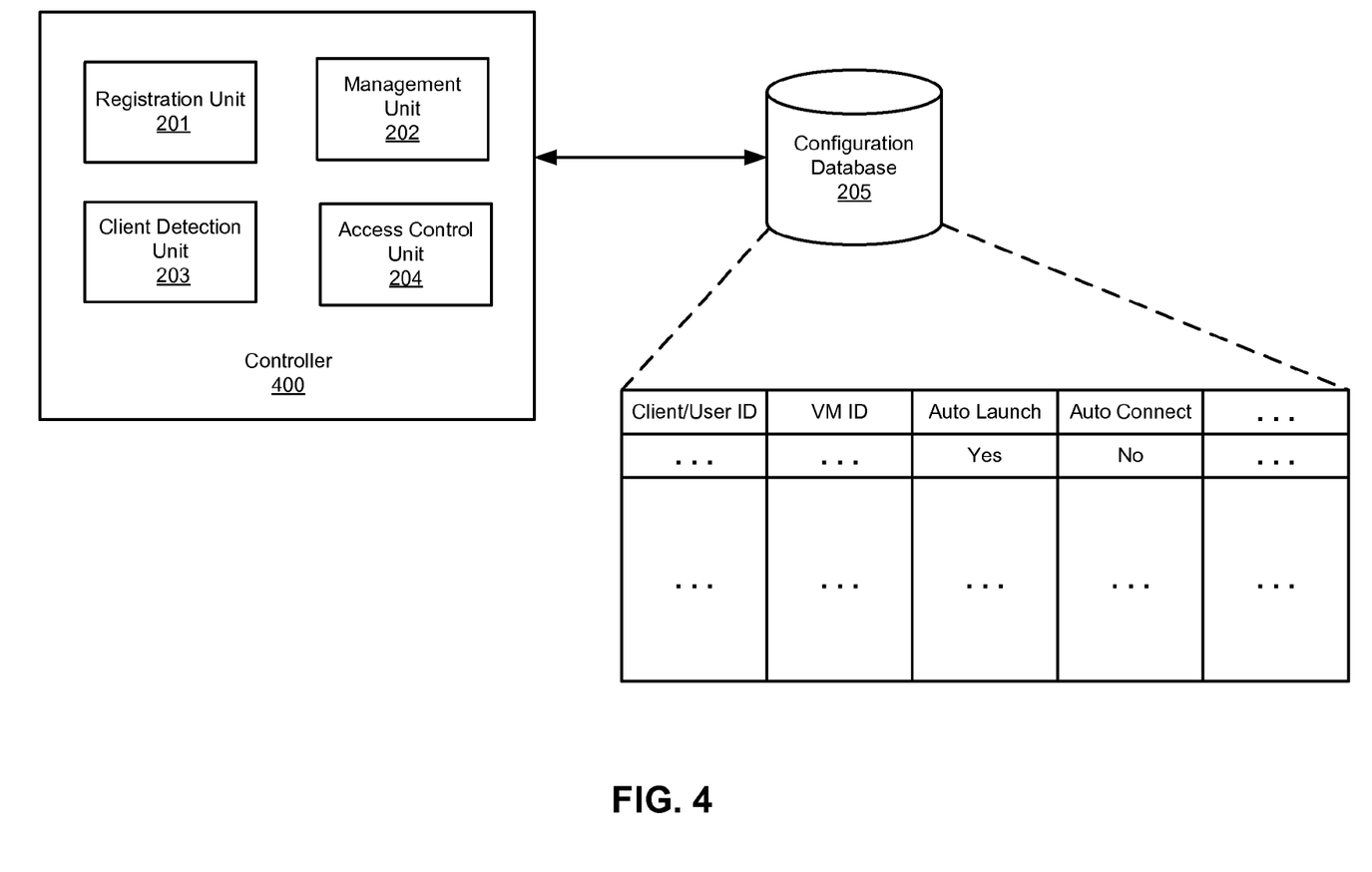
FIG. 4 is a block diagram illustrating an example of a control server according to another embodiment.

FIG. 4 is a block diagram illustrating an example of a control server according to another embodiment. For example, controller 400 may be implemented as part of controller 110 of FIG. 1 and configuration database 205 may be implemented as part of database 111 of FIG. 1. Similar to controller 200 of FIG. 2, controller 400 includes, but is not limited to, a registration unit 201, a management unit 202, and a client detection unit 203. Note that certain components having similar functionalities with respect to those as shown in FIG. 2 are maintained the same for the purpose of illustration. In addition, controller 400 includes an access control unit 204 configured to control accesses of a client to a VM.

According to one embodiment, once the VM has been launched, the access control unit 204 causes a connection (e.g., a SPICE or RDP connection) to be automatically established between a client application of the client and the VM, such that a user can instantly access an application running within the VM without having to access and log onto a Web portal and to select a VM to be launched. The connection may be automatically established if the associated VM has an "auto connect" option enabled. Note that the options of "auto launch" and "auto connect" may be independently configured. A VM may be configured to be automatically launched, but it requires a manual process to establish a connection with the VM, or vice versa.

As described above, the associated VM may be launched in another node (e.g., CBC or SBC node) or within the client. The VM may be launched substantially concurrently while the client is starting up. Note that some or all of the components as shown in FIG. 4 may be implemented in software, hardware, or a combination of both.

Figure 5:
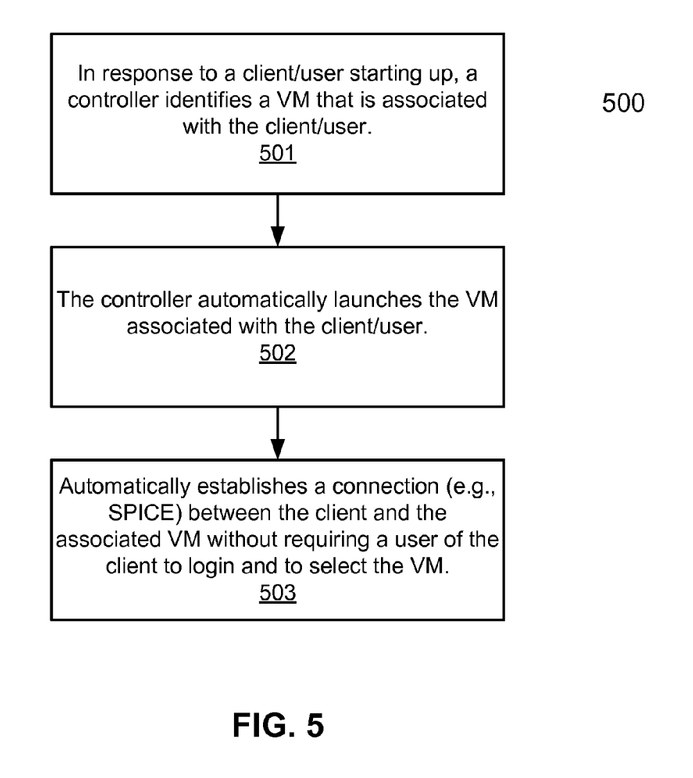
FIG. 5 is a flow diagram illustrating a method for launching a virtual machine for a client according to one embodiment.

FIG. 5 is a flow diagram illustrating a method for launching a virtual machine for a client according to one embodiment. Note that method 500 may be performed by processing logic which may include software, hardware, or a combination thereof. For example, method 500 may be performed by system 100 of FIG. 1. Referring to FIG. 5, in response to a client starting up, at block 501, a controller identifies a VM that is associated with the client. The associated VM may be previously registered, for example, by an administrator. During the registration, one or more attributes associated with the VM (e.g., "auto launch" and "auto connect" options) may also be specified and stored in the database. One or more VMs (e.g., individual VMs, a group of VMs, and/or a pool of VMs) may be configured and associated on a per client basis, per user basis, and/or per Enterprise entity basis.

At block 502, the controller causes the associated VM to be launched automatically of the "auto launch" option is enabled. Once both the client and the VM finish starting up, at block 503, a connection is automatically established between the client and the VM without requiring a user of the client to log onto a Web portal and to select the VM. The connection is automatically established if the associated "auto connect" option is enabled. As a result, the user can instantly access a remote application running within the VM such as a virtual desktop, as if the remote application were running locally. Other operations may also be performed. Other operations may also be performed.

Figure 6:
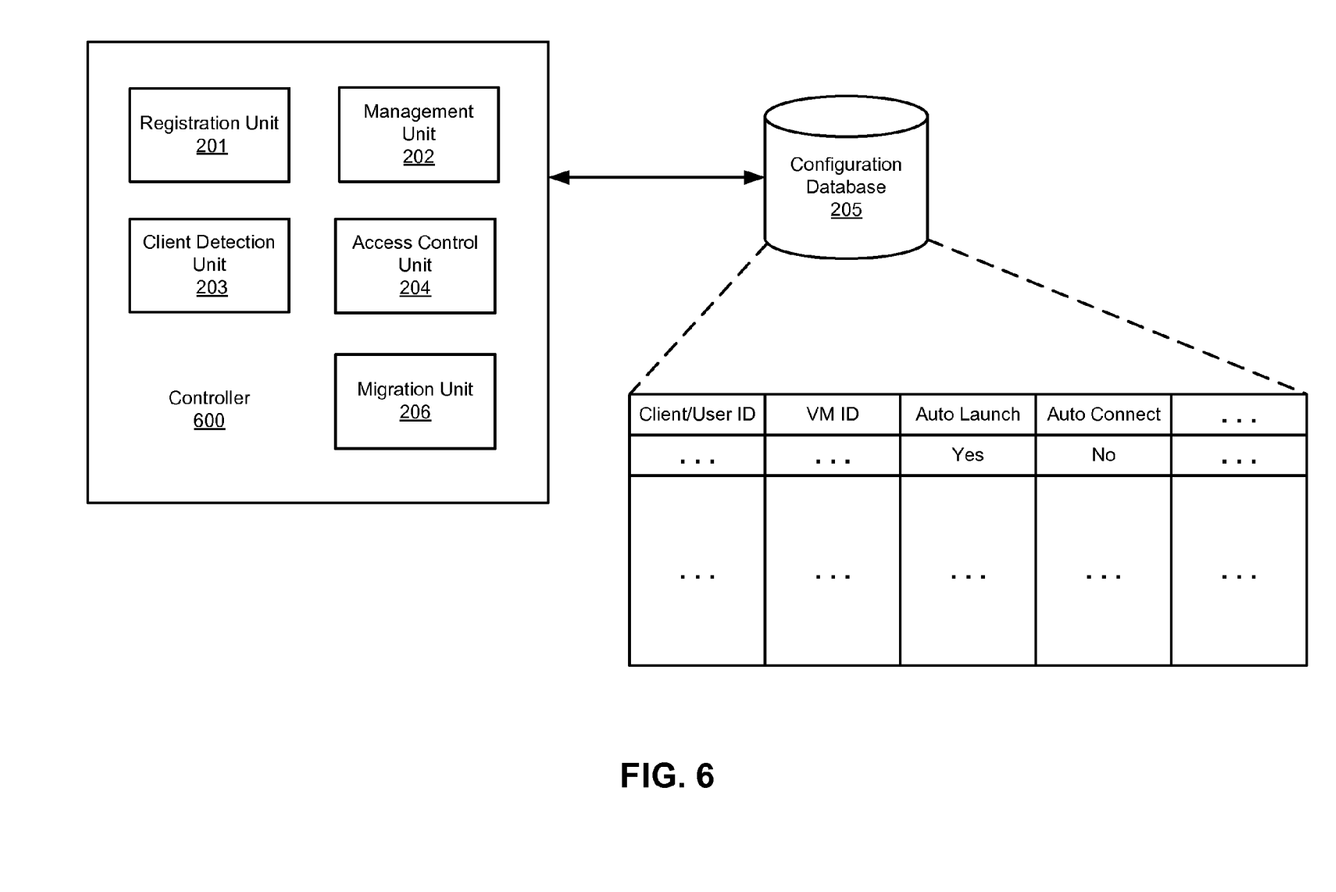
FIG. 6 is a block diagram illustrating an example of a control server according to another embodiment.

FIG. 6 is a block diagram illustrating an example of a control server according to another embodiment. For example, controller 600 may be implemented as part of controller 110 of FIG. 1 and configuration database 205 may be implemented as part of database 111 of FIG. 1. Similar to controller 400 of FIG. 4, controller 600 includes, but is not limited to, a registration unit 201, a management unit 202, a client detection unit 203, and an access control unit 204. Note that certain components having similar functionalities with respect to those as shown in FIG. 4 are maintained the same for the purpose of illustration. In addition, controller 600 includes migration unit 206 configured to cause a VM to be migrated from one node to another node.

As described above, when client detection unit 203 detects that a client is starting up, management unit 202 causes a VM associated with the client to be launched, for example, concurrently, at a remote node (e.g., a CBC or SBC node). Once both the client and the associated VM are up and running, access control unit 204 is configured to establish a connection between the client and the VM to allow a user of the client to instantly access content provided by the VM. Subsequently, the migration unit 206 may determine whether the client has sufficient processing resources to host the associated VM. If so, the migration unit 206 causes the associated VM to be migrated from the remote node back to the client. Note that some or all of the components as shown in FIG. 6 may be implemented in software, hardware, or a combination of both.

Note that a migration may be performed whenever a user connects to a VM from a different client. If a VM is running on a power client and the user connection is local, then there is no migration needed. In addition, since the connection is a local connection, there is no need for data compression and no network configuration is changed. In addition, if a VM is running on a power client or a SBC node and a user connects to the VM remotely, where the connection is established with data compression enabled, then a migration is performed and the data compression after the migration may be disabled if the source and target power clients are in different subnets. In a particular embodiment, data compression may be disabled only when the VM is running at a local client or alternatively, the data compression may be disabled when the VM and the client accessing the VM are located in the same local area network (e.g., same subnet). Furthermore, if a VM is running on a power client and a user connects to the VM from a client that has insufficient resources to host the VM, a connection is established as a remote connection with data compression enabled. A migration may be performed to migrate the VM from the power client to a SBC node. However, the data compression remains enforced and the network configuration may need to be changed.

Figure 7:
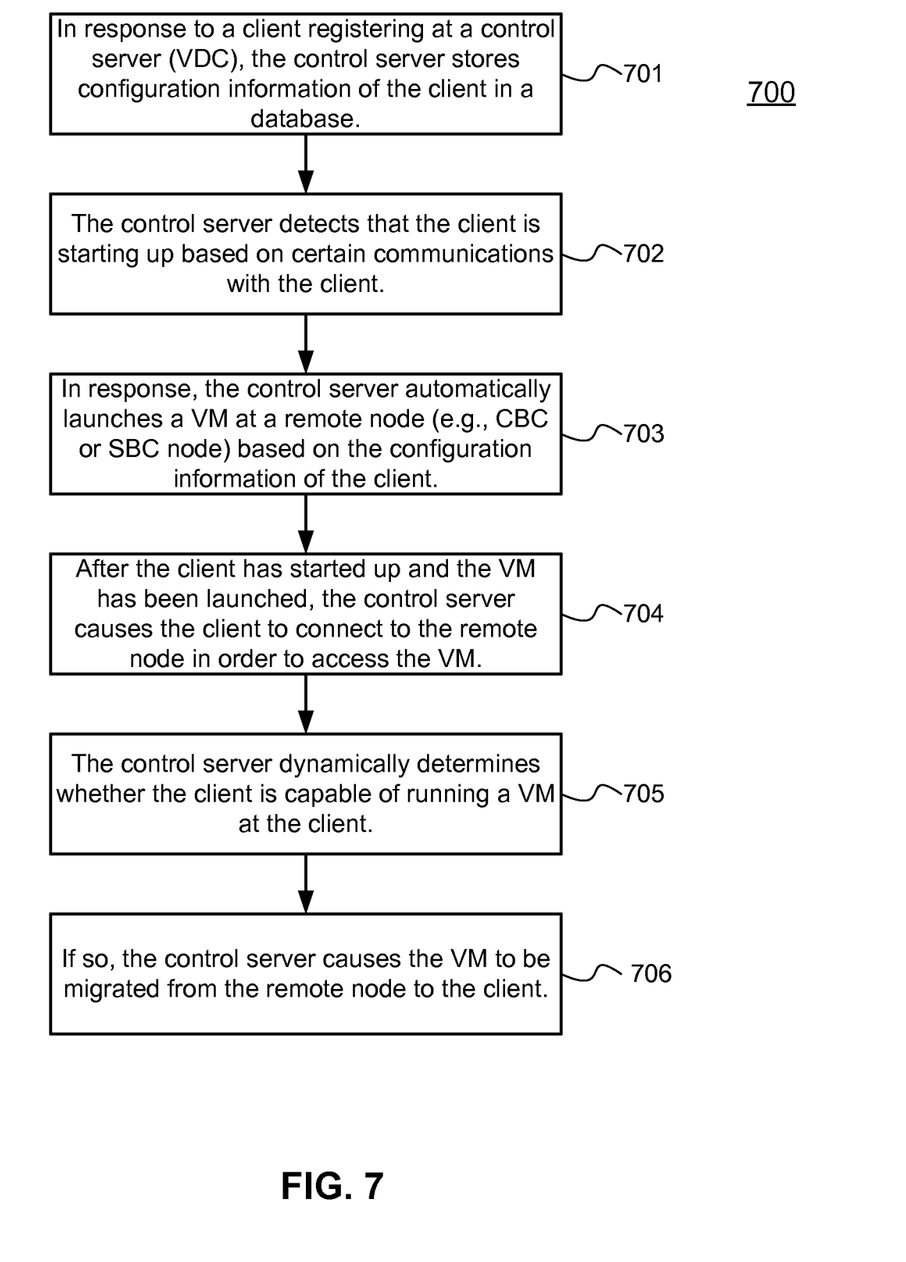
FIG. 7 is a flow diagram illustrating a method for launching a virtual machine for a client according to one embodiment.

FIG. 7 is a flow diagram illustrating a method for launching a virtual machine for a client according to one embodiment. Note that method 700 may be performed by processing logic which may include software, hardware, or a combination thereof. For example, method 500 may be performed by system 100 of FIG. 1. Referring to FIG. 7, in response to a client registering at a control server (e.g., VDC), at block 701, the control server stores configuration information of the client in a database, including associating a VM with the client. In one embodiment, one or more attributes associated with the VM (e.g., "auto launch" and "auto connect" options) may also be specified and stored in the database. One or more VMs (e.g., individual VMs, a group of VMs, and/or a pool of VMs) may be configured and associated on a per client basis, per user basis, and/or per Enterprise entity basis.

Subsequently, at block 702, the control server detects that the client is starting up based on certain communications with the client, for example, using certain techniques described above. For example, when a client is starting up, the client may actively send a message to the control server for such an indication. Alternatively, the control server may periodically or constantly poll (e.g., ping) the client in an attempt to determine whether the client is starting up.

In response, at block 703, the control server automatically launches a VM associated with the client in parallel at a remote node based on the configuration information of the client (e.g., if the "auto launch" option is enabled), for example, using certain techniques set forth above. The VM may be launched at a host server (e.g., SBC node) or a power client (e.g., CBC node). After the client has started up and the VM has been launched, at block 704, the control server causes the client to automatically connect to the remote node in order to access contents (e.g., applications) provided by the VM, based on the configuration of the VM (e.g., if the "auto connect" option is enabled). The client may establish a RDP or SPICE session to access the VM over a network.

At block 705, the control server dynamically determines whether the client is capable of hosting the VM. For example, if the client is a thin client, it is not capable of hosting a VM. However, if the client is a power client, it may or may not be capable of hosting a VM, as the client may have already hosted one or more VMs and it may not have enough resources remaining to host an additional VM. If it is determined that the client is capable of hosting the VM running at the remote node, at block 706, the control server causes the VM to be migrated from the remote node to the client. If the client is not capable of hosting the VM and the VM is currently hosted by another power client, the control server may cause the VM to be migrated to a host server (e.g., SBC host). Other operations may also be performed.

Figure 8:
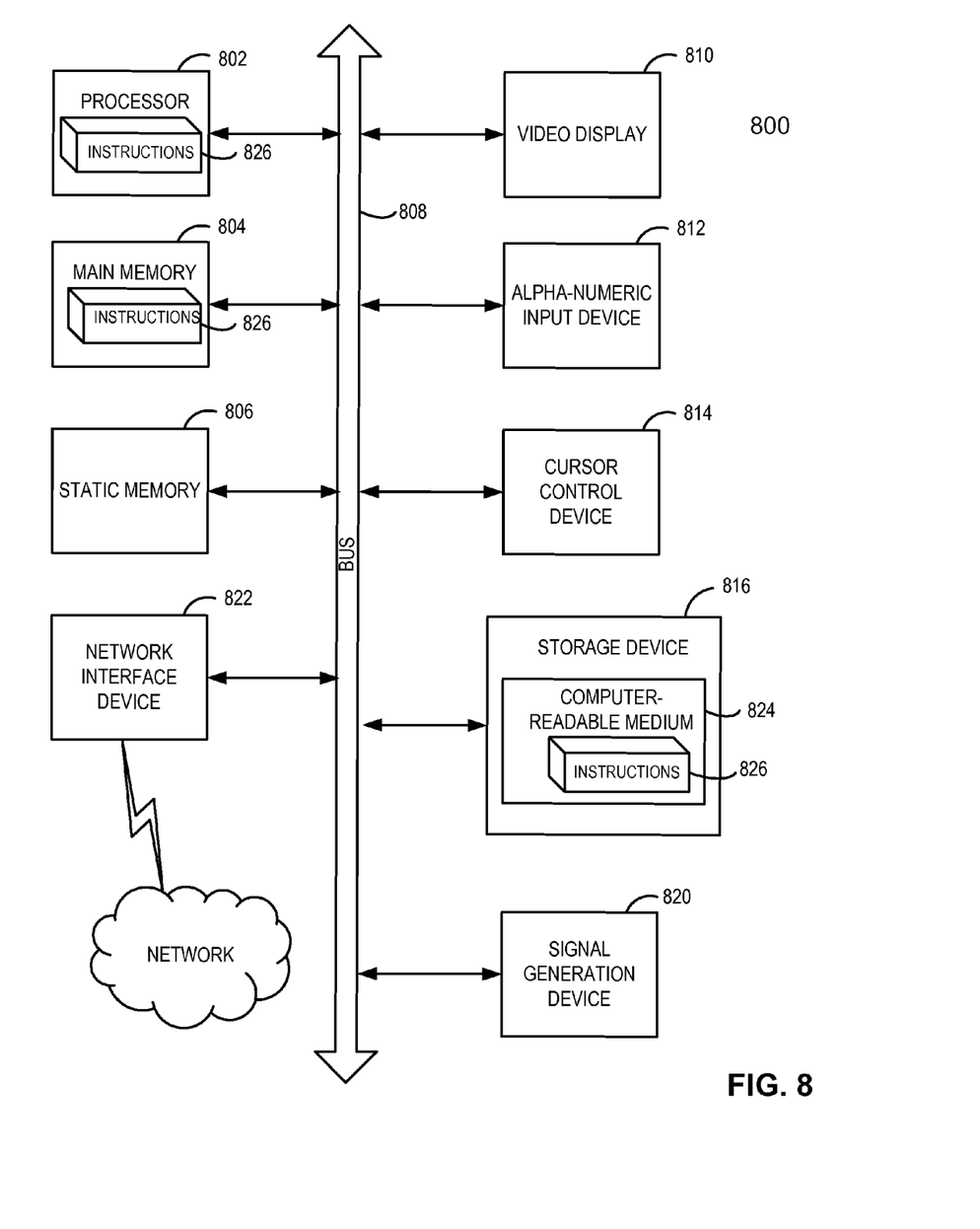
FIG. 8 illustrates a diagrammatic representation of a machine in the exemplary form of a computer system which may be used with an embodiment of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software 826 embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network via the network interface device 822.

Thus, techniques for automatically launching a virtual machine associated with a client during startup have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method, comprising:
    registering, by a controller server device, an association of a virtual machine (VM) to a client machine that is communicably coupled to the controller server device over a network, wherein the client machine is to at least one of display a desktop of the VM at the client machine or host the VM at the client machine;
    receiving, by the controller server device, a message from the client machine indicating that the client machine is starting up;
    identifying, by the controller server device in response to the message, that an auto-launch option of the VM associated with the client machine is selected; and
    in response to the auto-launch option of the VM being selected, launching, by the controller server device without user intervention, the VM over the network during a startup process of the client machine.

2. The method of claim 1, further comprising:
    identifying an application that is associated with the identified VM; and
    launching the application within the identified VM without user intervention.

3. The method of claim 2, further comprising storing registration information regarding the VM in a database associated with the controller server device, the registration information comprising an attribute for VM indicating whether the VM should be automatically launched without user intervention.

4. The method of claim 3, further comprising:
    associating the application with the identified VM;
    storing information regarding the application with the registration information of the identified VM in the database; and
    setting, in the registration information of the identified VM, an attribute representing the application that indicates whether the application should be automatically launched without user intervention.

5. The method of claim 4, further comprising, in response to the startup process of the client machine, searching within the database to locate the identified VM and the application in view of an identifier of the client machine.

6. The method of claim 1, further comprising establishing a connection between the client machine and the launched VM after the client and the launched VM have started up, such that a user of the client machine can instantly access contents provided by the launched VM.

7. The method of claim 6, wherein the connection comprises a communication session compatible with one of a remote desktop protocol (RDP) and a simple protocol for independent client computing (SPICE).

8. A non-transitory computer readable storage medium including instructions that, when executed by a processing device, cause the processing device to perform operations comprising:
registering, by the processing device of a controller server device, an association of a virtual machine (VM) to a client machine that is communicably coupled to the controller server device over a network, wherein the client machine is to at least one of display a desktop of the VM at the client machine or host the VM at the client machine;
receiving, by the controller server device, a message from the client machine indicating that the client machine is starting up;
identifying, by the controller server device in response to the message, that an auto-launch option of the VM associated with the client machine is selected; and
in response to the auto-launch option of the VM being selected, launching, by the controller server device without user intervention, the VM over the network.

9. The non-transitory computer readable storage medium of claim 8, wherein the operations further comprise:
identifying an application that is associated with the identified VM; and
launching the application within the identified VM without user intervention.

10. The non-transitory computer readable storage medium of claim 9, wherein the operations further comprise: storing registration information regarding the VM in a database associated with the controller server device, the registration information comprising an attribute for VM indicating whether the VM should be automatically launched without user intervention.

11. The non-transitory computer readable storage medium of claim 10, wherein the operations further comprise:
associating the application with the identified VM;
storing information regarding the application with the registration information of the identified VM in the database; and
setting, in the registration information of the identified VM, an attribute representing the application that indicates whether the application should be automatically launched without user intervention.

12. The non-transitory computer readable storage medium of claim 11, wherein the operations further comprise, in response to the startup process of the client machine, searching within the database to locate the identified VM and the application in view of an identifier of the client machine.

13. The non-transitory computer readable storage medium of claim 8, wherein the operations further comprise establishing a connection between the client machine and the launched VM after the client and the launched VM have started up, such that a user of the client machine can instantly access contents provided by the launched VM.

14. The non-transitory computer readable storage medium of claim 13, wherein the connection comprises a communication session compatible with one of a remote desktop protocol (RDP) and a simple protocol for independent client computing (SPICE).

15. A system, comprising:
a memory;
a processing device communicably coupled to the memory;
a network interface device communicably coupled to the memory and the processing device;
a client registration unit executable from the memory by the processing device and coupled to a network via the network interface device, the client registration unit to register an association of a virtual machine (VM) to with a client machine that is communicably coupled to the system over a network, wherein the client machine is to at least one of display a desktop of the VM at the client machine or host the VM at the client machine;
a client detection unit executable from the memory by the processing device and coupled to the network via the network interface device, the client detection unit to receive a message from the client machine indicating that the client machine is starting up; and
a controller executable from the memory by the processing device, the controller to:
identify, in response to the received message, that an auto-launch option of the VM associated with the client machine is selected; and
in response to the auto-launch option of the VM being selected, launch, without user intervention, the VM over the network during a startup process of the client machine.

16. The system of claim 15, wherein the controller is further to:
identify an application that is associated with the identified VM; and
launch the application within the identified VM without user intervention.

17. The system of claim 16, further comprising:
a configuration database communicably coupled to the controller, the configuration database to store registration and configuration information associated with the client machine and the identified VM, the registration and configuration information comprising an attribute of the identified VM that is to indicate whether the identified VM is automatically launched without user intervention.

18. The system of claim 17, wherein the controller further to:
associate the application with the VM and to store the registration information regarding the associated application in the database, including setting an attribute of the application indicating whether the application should be automatically launched without user intervention
associate the application with the identified VM;
store information regarding the application with the registration information of the identified VM in the database; and
set, in the registration information of the identified VM, an attribute representing the application that indicates whether the application should be automatically launched without user intervention.

19. The system of claim 18, wherein the controller further to, in response to the startup process of the client machine, search within the database to locate the identified VM and the application in view of an identifier of the client machine.

20. The system of claim 15, wherein the controller further to invoke an establishment of a connection between the client machine and the launched VM when the client machine and the launched VM have started, such that a user of the client machine can instantly access contents provided by the launched VM.

21. The system of claim 20, wherein the connection comprises a communication session compatible with one of a remote desktop protocol (RDP) and a simple protocol for independent client computing (SPICE).

* * * * *